United States Patent [19]

Drax et al.

[11] 3,944,737
[45] Mar. 16, 1976

[54] TELEVISION CAMERA MEASURING DEVICES

[75] Inventors: Heinz Drax, Munich; Hans Stut, Grobenzell, both of Germany

[73] Assignee: Siemens Aktiengesellschaft, Berlin & Munich, Germany

[22] Filed: Oct. 4, 1973

[21] Appl. No.: 403,555

[30] Foreign Application Priority Data
Oct. 16, 1972  Germany............................ 2250721

[52] U.S. Cl. ...... 178/7.2; 178/DIG. 1; 178/DIG. 36; 315/370
[51] Int. Cl.² ........................................... H04N 3/16
[58] Field of Search......... 178/DIG. 37, DIG. 1, 7.7, 178/DIG. 36, 7.2, 6, 6.8; 315/27 R, 27 GD, 370, 371; 356/158, 160

[56] References Cited
UNITED STATES PATENTS
3,243,509  3/1966  Stut.............................. 178/DIG. 36
3,598,963  8/1971  Osugi et al................... 178/DIG. 36

OTHER PUBLICATIONS
*Principles of Television Engineering*, Fink, First Edition, 1940, pp. 54–57.
*Instrum. & Exp. Tech.*, Vol. 15, No. 1, part 1 Jan.–Feb. 1972.

*Primary Examiner*—George H. Libman
*Attorney, Agent, or Firm*—Hill, Gross, Simpson, Van Santen, Steadman, Chiara & Simpson

[57] ABSTRACT

A circuit for improving the accuracy of a video measuring device which removes errors caused by variations in the horizontal deflection voltage by continuously monitoring the horizontal deflection voltage and comparing it with a preset reference voltage and adjusting the horizontal deflection voltage if any variation from the reference occurs. This assures that measurements made with the video system remain accurate at all times and measurements can be made with great accuracy.

2 Claims, 1 Drawing Figure

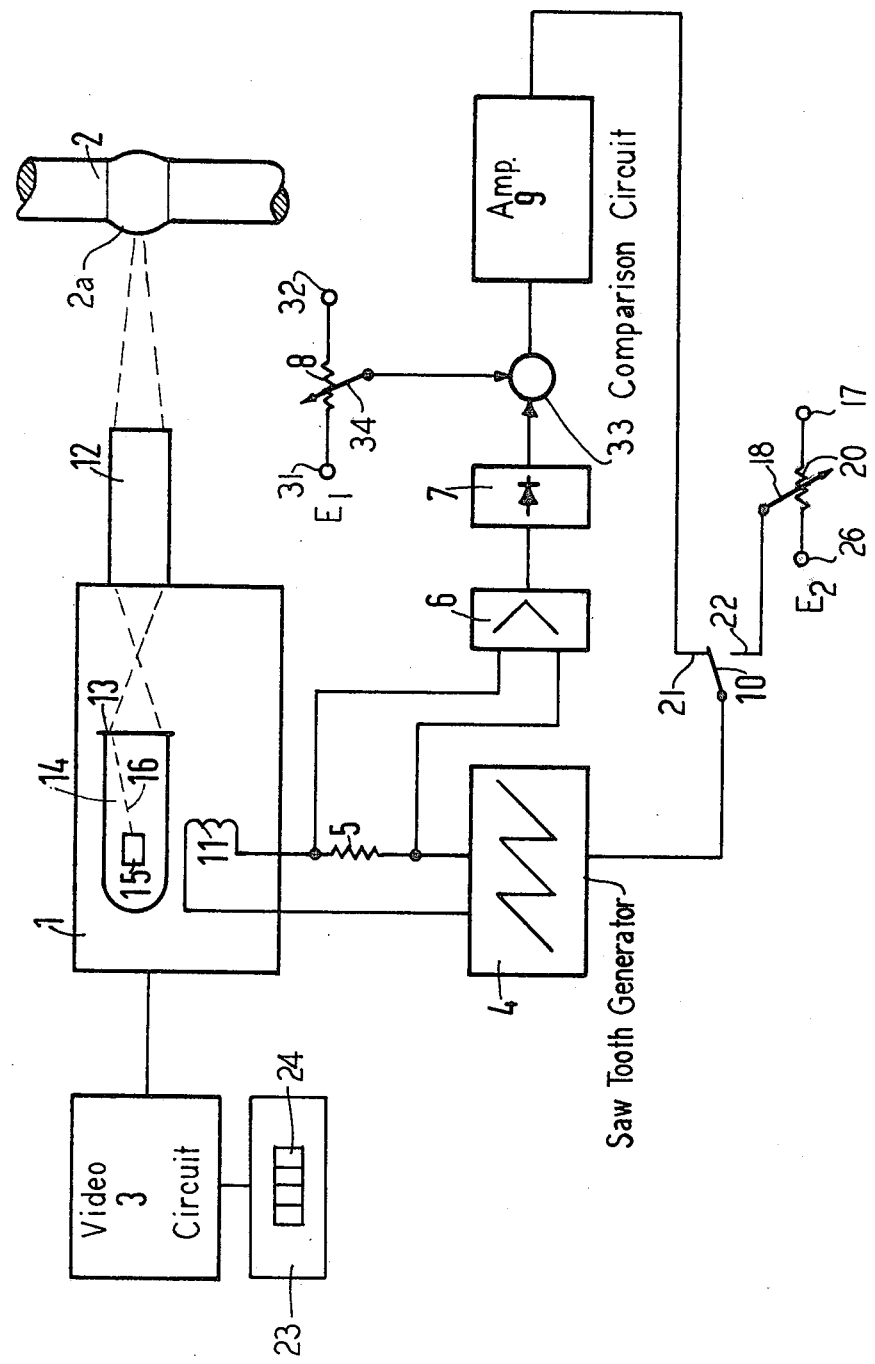

TELEVISION CAMERA MEASURING DEVICES

BACKGROUND OF THE INVENTION

1. Field of the Invention

This invention relates in general to measuring devices and in particular to a novel type television camera measuring system.

2. Description of the Prior Art

Television systems have been used for measurement purposes however systems of the prior art normally had a relatively poor linearity and operational stability with regard to the geometry of the optical—electrical image conversion function and thus measurements made with such systems are often inaccurate. The reasons for these inaccuracies is that the horizontal deflection system which deflects the electron beam which scans the image of the object in a television camera tube such as a vidicon is subject to nonlinearity effects, drift effects and fluctuations which depend upon the operating temperature of the camera. Since the camera operates under widely differing temperature ranges such errors are common. One reason for the fluctuations which occur during temperature changes is that the camera components including the conductor leads have characteristics which vary as a function of temperature and thus as the temperature changes the amplitude of the horizontal deflection current will vary in the deflection system.

Since the amplitude of the horizontal deflection current determines the angle of the electron beam in the horizontal plane, variations in the horizontal deflection current will result in scanning rate changes and the scanning time within which a given object is scanned and it is this time which is used to represent a measure of the geometric width of an object. Thus variations in the amplitude of the horizontal deflection current cause inaccuracies in measurements made with such systems.

SUMMARY OF THE INVENTION

It is an object of the present invention to provide a television camera measuring system which eliminates the inaccuracies caused by variations in the horizontal deflection voltage for a vidicon tube so as to provide a measurement system of high accuracy.

The invention provides for monitoring and controlling the horizontal deflection coil current so that the current is regulated to a constant peak amplitude as it scans the photosensitive target of a television camera tube thus stabilizing measurements of objects impressed upon the target of the television camera tube.

A saw tooth generator which provides an output saw tooth wave which applies current to the horizontal deflection coil is monitored and rectified and compared with a preset reference current. If the detected horizontal deflection current varies from the reference current an output is produced which is proportional to this difference and is supplied to the control of the saw tooth generator so as to vary its output until it equals that of the preset current. An alternative system is provided wherein a preset signal can be suppled to the saw tooth generator to control its output in the event that the follow-up system of the invention fails or for some reason is disconnected.

Other objects features and advantages of the invention will be readily apparent from the following description of certain preferred embodiments thereof taken in conjunction with the accompanying drawings although variations and modifications may be effected without departing from the spirit and scope of the novel concepts of the disclosure and in which

BRIEF DESCRIPTION OF THE DRAWING

The FIGURE is a block diagram of the improvement in television camera measuring device.

DESCRIPTION OF THE PREFERRED EMBODIMENTS

The FIGURE illustrates the very accurate measuring system of the invention which can be used for example in industrial production of monocrystalline silicon by non-crucible zone drawing, for example, and in which the peak value of the horizontal deflection current is maintained at a constant amplitude thus allowing measurements of high accuracy to be maintained. By maintaining such horizontal deflection current at a constant amplitude the electron beam of the vidicon tube will be deflected in a constant manner irrespective of operating conditions such as temperature variations and the scanning time required to scan an object will be maintained constant thus allowing accurate measurements to be made.

In the FIGURE an object which is to be measured might, for example, be the melt zone produced during a non-crucible zone melting process of a semiconductor rod is to be measured. The rod 2 has a melt portion 2a which is to be measured. An optical system 12 of a television camera 1 projects the object to be measured onto the target 13 of a vidicon television camera tube 14. The vidicon target 13 is scanned in line fashion by an electron beam 16 produced by an electron gun 15. The horizontal deflection coil 11 is provided which scans the electron beam in the horizontal direction on the vidicon target 13.

The output of the vidicon tube 14 is a modulated electrical signal comprising the modulation of the beam 16 by the image on the target 13 is provided to a video signal processing circuit 3 which provides an output to an indicator 23 that processes the signal and provides the measurement indicator 24 of the object being observed.

The present invention provides automatic means for maintaining the horizontal deflection current in the deflection coil 11 at a constant peak value so that the measurements made with the system of the invention will be accurate and will not vary with temperature and other changes in the system. A horizontal deflection current generator 4 produces a saw tooth wave which is fed to the horizontal deflection coil 11 in series with a pickup resistor 5.

A signal is supplied to an amplifier 6 from opposite ends of the pickup resistor 5 and the voltage drop across the resistor 5 will at any instant be proportional to the deflection current in the coil 11 at that instant. The saw tooth voltage occurring at the output of the amplifier 6 is supplied to a rectifier 7 which produces an output d.c. voltage proportional to the peak value of the deflection current furnished by the saw tooth generator 4. A comparison circuit 33 receives the output of rectifier 7 and compares it with a voltage on a variable wiper contact 34 of a potentiometer 8 which has terminals 31 and 32 to which a reference voltage $E_1$ is applied. The comparison circuit produces an output which is the difference between the output of the rectifier 7 and the voltage on the contact 34 of the potentiometer 8 and supplies it to an amplifier 9. The output of the amplifier 9 is supplied to a contact 21 of a switch havng a movable contact 10 which when in engagement with the contact 21 supplies an input to the saw tooth generator 4 to control peak amplitude current of the saw tooth generator 4.

Thus, in operation the contact 34 of the potentiometer 8 sets the level of the horizontal deflection current applied by the generator 4 to the horizontal deflection coil 11 and if the current to the horizontal deflection coil 11 increases or decreases this will be detected as an output of the comparison circuit 33. Such output will be fed to the saw tooth generator 4 through the amplifier 9 to adjust the peak amplitude of the saw tooth current from the generator 4 to the level where the output of the rectifier 7 is equal to the signal on the variable contact 34 of the potentiometer 8. Thus the circuit includes an automatic follow-up system to maintain the horizontal peak of the horizontal deflection current constant in the horizontal deflection coil 11.

We realize, of course, that if the peak value of the saw tooth current wave is to be set to any other value the movable contact 34 may be set to a different level and circuit of the invention will adjust the output of the saw tooth wave generator 4 to such new value.

The movable contact 10 may be moved to engage the contact 22 to apply voltage from the movable contact 18 of the potentiometer 20. The potentiometer 20 has contacts 26 and 17 to which a voltage $E_2$ is applied. When the switch 10 engages the contact 22 the output of the saw tooth generator 4 will have a peak amplitude depending on the voltage on the wiper contact 18. This arrangement may be used for calibration purposes or in the event that some of the components in the automatic control system fail.

It is seen that invention provides a new and novel circuitry for automatically maintaining the amplitude of the saw tooth current in the horizontal deflection coil constant so as to maintain linearity in the measuring device.

Although the invention has been described with respect to preferred embodiments it is not to be so limited as changes and modifications may be effected which are within the full intended scope as defined by the appended claims.

What we claim is:

1. A device for monitoring the molten zone of a semiconductor rod in a crucible free melting system comprising a television camera having a vidicon tube for monitoring the melting zone and in which an image of the melting zone is projected onto said vidicon tube and in which said vidicon tube is scanned by an electron beam, a deflection coil for scanning said electron beam in the horizontal direction, a saw tooth generator connected to said deflection coil and providing an alternating current thereto, a resistor connected between said saw tooth generator and said deflection coil, a rectifier connected to said resistor and producing a direct current which is analogous to the peak value of said alternating current supplied to said deflection coil, a reference voltage, a potentiometer connected across said reference voltage, a comparison circuit having inputs connected to said rectifier and said potentiometer and supplying an output indicative of the difference in values of the inputs, and an amplitude adjusting means in said saw tooth generator which receives the output of said comparison circuit to control the amplitude of the alternating current output supplied to said deflection coil.

2. A device for monitoring according to claim 1 including an amplifier connected between said resistor and said rectifier.

* * * * *